UNITED STATES PATENT OFFICE.

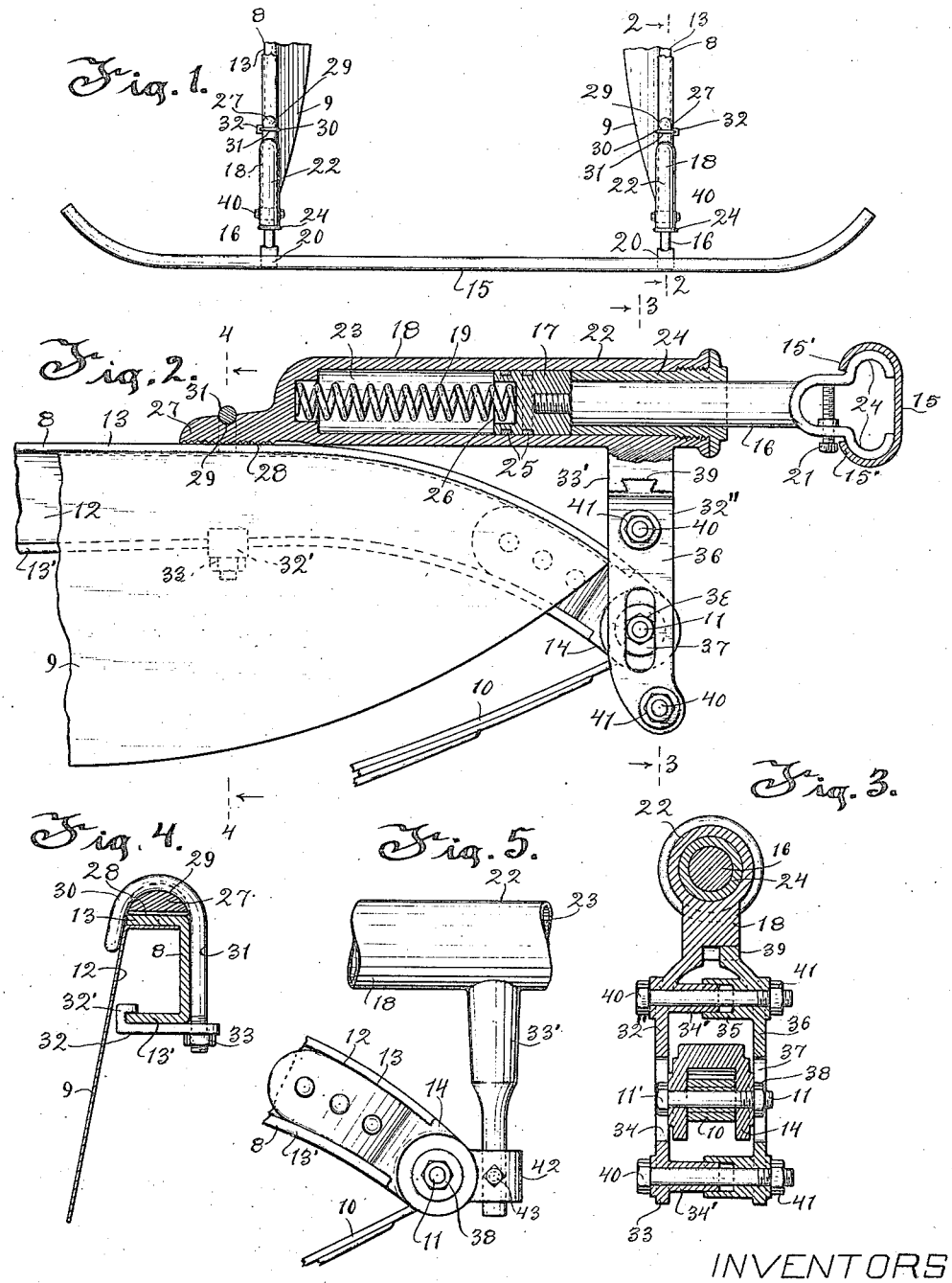

FRIEDRICH LEDERER AND FREDERICK B. LEDERER, OF MILWAUKEE, WISCONSIN.

AUTOMOBILE-BUMPER.

1,307,056.   Specification of Letters Patent.   Patented June 17, 1919.

Application filed April 19, 1917. Serial No. 163,200.

*To all whom it may concern:*

Be it known that we, FRIEDRICH LEDERER and FREDERICK B. LEDERER, citizens of the United States, and residents of Milwaukee, in the county of Milwaukee and State of Wisconsin, have invented new and useful Improvements in Automobile-Bumpers, of which the following is a description, reference being had to the accompanying drawings, which are a part of this specification.

This invention relates to improvements in automobile bumpers.

It is one of the objects of the present invention to provide an automobile bumper which may be easily mounted upon an automobile frame without the necessity of drilling or cutting said frame.

A further object of the invention is to provide an automobile bumper which may be easily adjusted to fit automobile frames which vary in shape and size.

A further object of the invention is to provide an automobile bumper by means of which the impact of the automobile striking an object will be resiliently cushioned by both a spring means and a pneumatic means, the pneumatic means also serving to cushion the reaction movement of the bumper bar.

A further object of the invention is to provide an automobile buffer in which the impact or buffer bar is of novel formation and is secured to the bumper bracket in a novel manner to eliminate projections or shoulders and thus provide perfectly smooth impact surfaces for the bar.

A further object of the invention is to provide an automobile bumper which is of simple construction, is strong and durable and is well adapted for the purpose described.

With the above and other objects in view the invention consists of the improved automobile bumper and its parts and combinations as set forth in the claims and all equivalents thereof.

In the accompanying drawing in which the same reference characters indicate the same parts in all of the views:

Figure 1 is a top view of the end portions of an automobile frame having the improved bumper mounted thereon;

Fig. 2 is a vertical sectional view thereof taken on line 2—2 of Fig. 1;

Fig. 3 is a sectional detail view thereof taken on line 3—3 of Fig. 2;

Fig. 4 is a transverse sectional view taken on line 4—4 of Fig. 2; and

Fig. 5 is a side detail view of a slightly modified form of attaching bracket.

Referring to the drawing the numeral 8 indicates the side bars of the frame of an automobile or other like vehicle 9, the apron, 10 the half elliptical springs and 11 the spring bolts which connect the springs to the frame. The side bars are usually formed of channeled metal with the open sides 12 extending inwardly toward each other. The upper and lower walls 13 and 13' of the side bars usually converge toward each other and curve downwardly at their ends and are riveted to eyed and recessed end members 14 to which the ends of the springs 10 are pivotally connected by the spring bolts 11. The improved bumper is connected to the side bars and the bolts and comprises in general the buffer bar 15, the buffer bar plungers 16 having pistons 17 formed on their inner ends, cylinder brackets 18 and resilient members 19 interposed between the pistons and the brackets. The buffer bar 15 is preferably of oval channel shape in cross section with the side edges or flanges 15' of the bar curved toward each other at the rear or inner side of the bar. The outer end portions of the plungers 16 are bifurcated or split and the spaced end portions 20 thereof extend into the channel 15 and are shaped to conform and snugly fit the inner contour of the upper and lower portions of the bar 15. The bifurcated portions extend from points beyond the buffer bar and a bolt 21 threaded through the lower member of each bifurcated part and impinging against the upper member thereof is provided to spread said members apart and form what might be termed a clamping engagement therebetween thus providing a construction for fitting side bars of varying distances apart.

The brackets are formed with horizontally extending cylindrical portions into the bores 23 of which the plungers 16 extend. The plungers are of less diameter than the bores and reciprocate through stop sleeves 24 which are threaded into the open ends of the cylindrical portions and form bearings for said plungers and stops to limit the outward movement of the pistons 17 mounted on the inner ends of the plungers.

The pistons are provided with packing rings 25 and with inner end recesses 26 to guide the coiled springs 19 positioned within the bores and interposed between the pistons and the inner ends of the bores to yieldingly hold the pistons in their outermost position. The movement of the pistons within the cylinders serves to cushion the impact of striking an object and also serves to cushion the return movement of the pistons against the stop sleeves 24 and while provided with packing rings to retard the escape of air, the rings may be omitted if desired.

The cylindrical portions of the brackets are provided with rearwardly extending rounded lugs 27 having transverse teeth or serrations 28 formed on their lower surfaces which bear against the upper surfaces of the side bars 8. The upper portions of the lugs are formed with transverse grooves 29 to receive the hooked ends 30 of clamping bolts 31 which clamp the brackets to the side bars.

The bolts extend downwardly from the hooked portions and on the outer sides of the bars and through openings in the outer end portions of hook members 32 and are provided with nuts 33 on their lower ends. The hooked end portions 30 of the clamping bolts extend downwardly below the edges of the upper flanges of the side bars to maintain the lugs in position, and the hooked portions 32' of the hook members 32 hook over the inner edges of the lower flanges of the side bars for the same purpose and thus securely clamp the rear portions of the brackets to the side bars without interfering in any manner with the apron 9 of the frame.

The front attaching portion 32'' of each bracket 18 consists of a downwardly extending fixed clamp arm 33' which bears against the outer side of each side bar end member 14 and is provided with an elongated slot 34 to adjustably accommodate the projecting head 11' of the spring bolt 11. The arm 33 above and below the end member 14 is provided with transversely extending tubular projections 34' which are telescoped by similar projections 35 extending transversely from a movable clamp arm 36 positioned on the opposite or inner side of the said side bar end member 14. This movable clamp member is also provided with an elongated slot 37 to adjustably accommodate the projecting nut 38 threaded on the bolt 11. The upper end portion of the movable clamp arm 36 is slidably connected to the fixed clamp arm 33' by a dovetail connection 39 to permit the assembling of the parts on opposite sides of the side bar end member. Bolts 40 extending through the telescoping tubular projections and having nuts 41 threaded on their ends serve to firmly clamp the bracket 18 to the side bar end member in a position so that the spring bolts will receive the shock of movement of the buffer bar.

The elongated slots of the side clamp arms provide for attaching the brackets to side bars of various distances between the spring bolts and the plane of the upper flanges of the side bars.

In the modified form shown in Fig. 5 the side bar end member 14 is formed with an integral forwardly projecting eyed lug 42 to adjustably receive the downwardly extending arm 33'. The said arm is adjustable vertically in said eyed lug to permit its other attaching portion to be attached to the side bar and is held in adjusted position by a bolt 43 threaded into the lug and impinging against the said arm 33'.

From the foregoing description it will be seen that the automobile bumper is of simple construction and is well adapted for the purpose described.

What we claim as our invention is:

1. A vehicle bumper, comprising a transverse buffer bar, brackets having relatively non-movable rearwardly and downwardly extending portions, plungers having a yielding and slidable connection with the brackets and an adjustable connection with the buffer bar, means for adjustably connecting the rearwardly extending bracket portions to the vehicle side bars, and other means for adjustably connecting the downwardly extending portions of the brackets to the forward end portions of the side bars.

2. The combination with a vehicle frame having side bars, of a bumper therefor, comprising a transverse buffer bar, brackets having relatively non-movable rearwardly and downwardly extending portions, plungers having a yielding and slidable connection with the brackets and an adjustable connection with the buffer bar, hook means for adjustably connecting the rearwardly extending bracket portions to the side bars, and means for vertically adjustably connecting the downwardly extending portions of the brackets to the forward end portions of the side bars.

3. The combination with a vehicle frame having side bars provided with end members having transversely extending spring bolts, of a bumper therefor, comprising a transverse buffer bar, brackets having means for attachment horizontally to the upper portions of the side bars and vertically adjustably to the opposite sides of the end members and bearing laterally against the spring bolts, plungers resiliently engaging the brackets, and a transverse buffer bar adjustably connected to the plungers.

4. The combination with a vehicle frame having side bars provided with end members having transversely extending spring bolts, of a bumper therefor, comprising brackets having rearwardly extending lugs and downwardly extending arms, means for adjustably attaching the lugs to the upper surfaces of the side bars, said downwardly extending arms vertically adjustably engaging opposite sides of the end members and bearing laterally against the spring bolts, plungers resiliently engaging the brackets, and a transverse buffer bar adjustably connected to the plungers.

5. The combination with a vehicle frame having side bars provided with end members having transversely extending spring bolts, of a bumper therefor, comprising brackets having rearwardly extending lugs and downwardly extending arms, means for horizontally adjustably attaching the lugs to the upper surfaces of the side bars, said downwardly extending arms being formed of two parts which extend vertically adjustably on opposite sides of the end members and bear laterally against the spring bolts, means for clamping the two part arms against the end members, plungers resiliently engaging the brackets, and a transverse buffer bar connected to the plungers.

6. A vehicle bumper, comprising tubular brackets having rearwardly extending lugs and downwardly extending two part arms, said arms constructed to vertically adjustably clampingly engage the end portions of a vehicle frame, hook shaped members for horizontally adjustably clamping the lugs to the upper portion of a vehicle frame, plungers having pistons which reciprocate in the bores of the tubular portions of the brackets, resilient means positioned within the bracket bores and interposed between the pistons and the ends of the bores, and a transverse buffer bar adjustably connected to the plungers.

7. A vehicle bumper, comprising tubular brackets having rearwardly extending lugs and downwardly extending two part slotted arms, said two parts having a dovetail connection with each other, bolts extending through the two parts, hook shaped members engaging the rearwardly extending lugs, plungers having pistons which reciprocate in the bores of the tubular portions of the brackets, resilient means positioned within the bracket bores and interposed between the pistons and the ends of the bores, and a transverse bar adjustably connected to the plungers.

In testimony whereof, we affix our signatures.

FRIEDRICH LEDERER.
FREDERICK B. LEDERER.